R. A. KELLY.
LIFE-GUARD FOR REAPERS AND MOWERS.
No. 259,316. Patented June 13, 1882.
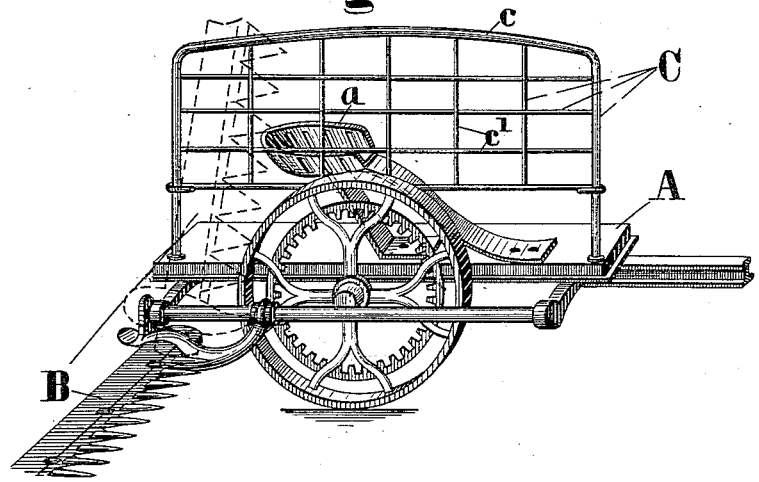
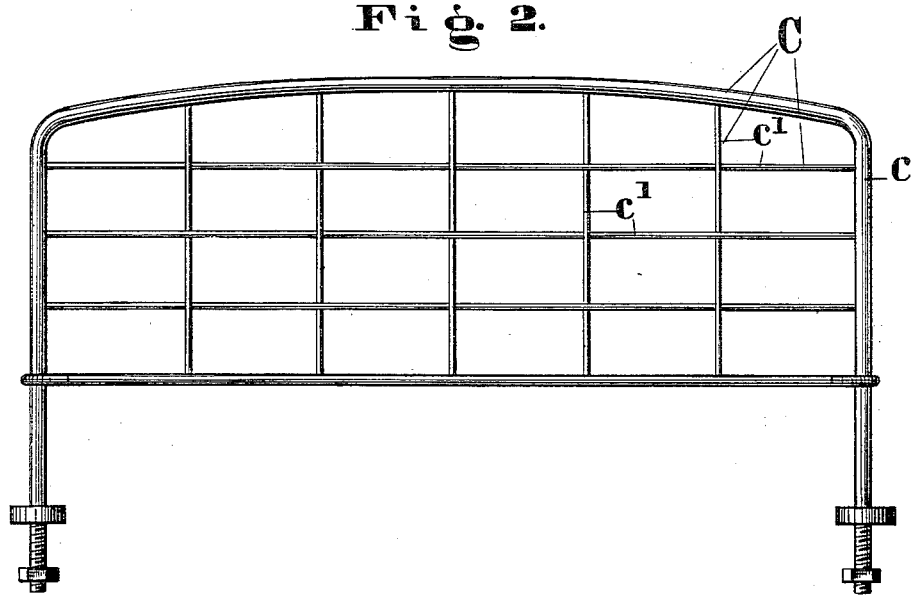
WITNESSES:
Thos. W. Talbott
T. S. West
INVENTOR:
RICHARD A. KELLY,
BY H. W. Beadle & Co.
ATTYS.

UNITED STATES PATENT OFFICE.

RICHARD A. KELLY, OF MANCHESTER, IOWA.

LIFE-GUARD FOR REAPERS AND MOWERS.

SPECIFICATION forming part of Letters Patent No. 259,316, dated June 13, 1882.

Application filed September 19, 1877.

*To all whom it may concern:*

Be it known that I, RICHARD A. KELLY, of Manchester, county of Delaware, and State of Iowa, have invented a new and Improved Life-Guard for Reapers and Mowers; and I hereby declare that the following is a full, clear, and exact description of the same, reference being had to the drawings forming part of this specification.

This invention consists mainly in the combination, with a harvester-frame carrying a driver's seat and having a folding cutter-bar attached thereto, of a life-guard located on the frame between the seat and the folding bar.

It further consists, in the combination, with a harvester-frame carrying a driver's seat and having a cutter-bar attached thereto, of a grated guard located between the seat and cutter-bar, as will be fully described hereinafter.

In the drawings, Figure 1 represents a perspective view of a mower having my invention applied thereto, and Fig. 2 a front elevation of the life-guard detached.

To enable others skilled in the art to make my improved life-guard, I will proceed to describe fully the construction of the same.

A represents a mower or harvester frame of any proper construction, and $a$ the usual driver's seat located thereon.

B represents a cutter-bar secured to the harvester-frame at the proper point by means of a hinge-connection, as shown.

C represents a life-guard located on the grain or grass side of the harvester or mower frame and strongly secured thereto, which consists of a proper outer frame, $c$, and vertical and horizontal rods $c'$ $c'$, so arranged as to form a grating with coarse meshes, as shown. This guard C, it will be observed, extends in a rearward and forward direction far enough to serve as a stop for limiting the movement of a rear or front cut cutter-bar when the latter is folded. The movement of the cutter-bar in folding is arrested at a point sufficiently remote from the driver's seat to make it absolutely certain that no injury will result to him, even if the folding occurs at an unexpected moment, as by the tipping over of the machine. In such a case the driver is necessarily thrown out of his seat onto the bar; but the guard serves to separate him from and keep him above the sickle.

The guard C, it will be observed also, is located between the driver's seat and the space in front of the cutter-bar, so that it is impossible for the driver to be thrown off in front of the cutter-bar. The guard C, it will be observed also, is located in such proximity to the driver's seat and its meshes are of such size that it furnishes a number of convenient hand-holds, some one of which may be conveniently grasped when the occasion for their use occurs. The junction of the front vertical bar of the guard and the frame furnishes also a convenient foot-rest when increased stability is required by the driver. The size of the meshes, also, is such as to permit the driver to see readily the condition of the work before him.

The advantages resulting from the use of my invention will be more readily understood if the character of the accidents which it is designed to prevent is first explained.

The ordinary accidents resulting from the use of mowers and harvesters are three in number, as follows:

First. As the driver occupies an elevated position and the wheels of the harvester are comparatively near together, a narrow base results. On side hills, or in case the "off" wheel goes in a hole or the "near" one goes over a rock, the machine will certainly tip, and may go over, in which case the parts, shutting up like a knife, catch the driver and mangle him with the knives.

Second. The driver, in consequence of the cutter-bar or power striking a rock or stump, or from other cause, may be thrown off into the space before the cutter-bar and be literally cut to pieces by the knives.

Third. The driver may be thrown off upon the other side of the machine or be thrown forward and be more or less injured in consequence.

The first and second classes of these accidents are much more terrible in their nature than the third, and these are absolutely prevented by my invention. The third class, also, is prevented in a great measure, first, by the increased stability given to the driver in his seat by the use of the foot-rest; and, second, by the opportunity to catch with the hand a proper support in case the balance is lost. In addition, also, to the protection afforded the life of the driver, an advantage results in the lessening of the fatigue and physical strain incidental to this kind of work.

By the use of the foot and hand rests the body is protected in part from the violent wrenchings which necessarily result unless an auxiliary support is used. A change of position, also, is possible to some extent.

Having thus fully described my invention, what I claim as new, and desire to secure by Letters Patent, is—

1. In combination with a harvester-frame carrying a driver's seat and having a folding cutter-bar attached thereto, a life-guard located on the frame between the seat and the folding bar, substantially as described.

2. In combination with a harvester-frame carrying a driver's seat and having a cutter-bar attached thereto, a grated guard, substantially as described, adapted to serve as a hand or foot rest for the driver.

In testimony whereof I have signed my name to the foregoing specification in the presence of two subscribing witnesses.

RICHARD A. KELLY.

Witnesses:
J. L. KELSEY,
E. W. BALDWIN.